April 23, 1935.  T. SCOTT  1,999,112
REFINING OR PURIFICATION OF BENZOL, PETROL, AND LIKE LIGHT SPIRITS
Filed Jan. 4, 1934
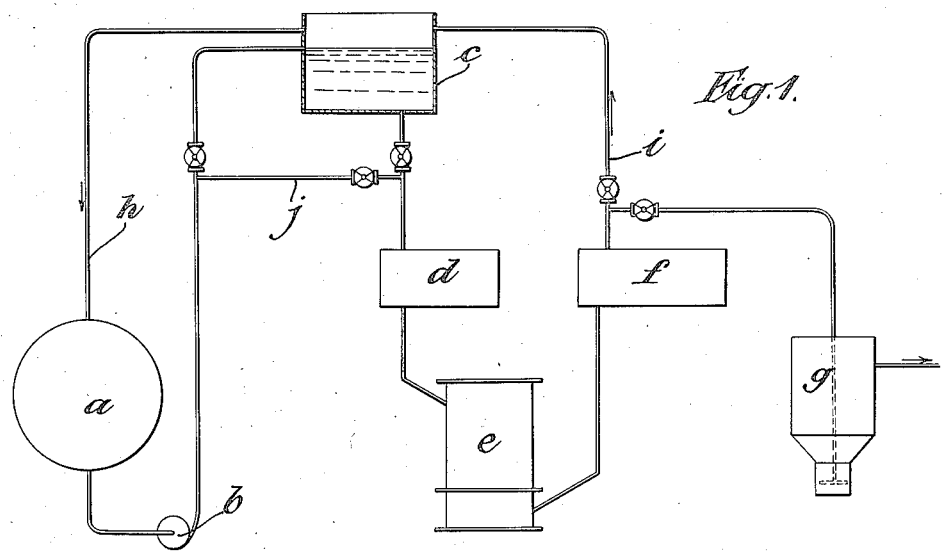
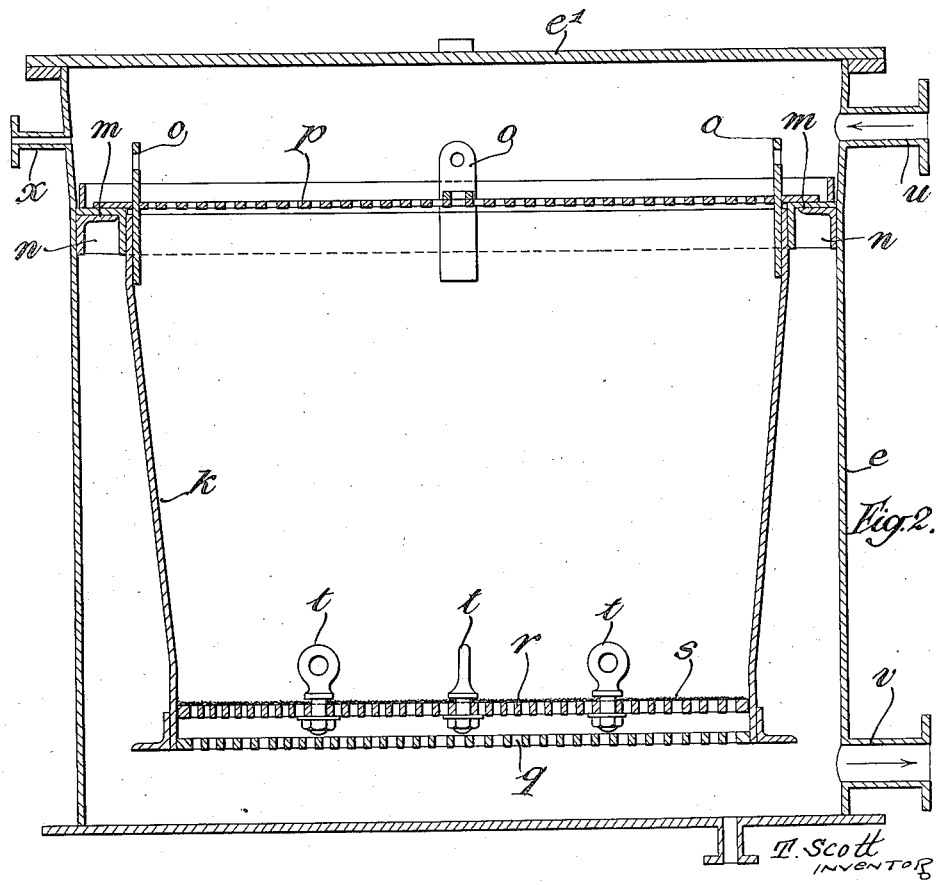

Patented Apr. 23, 1935

1,999,112

UNITED STATES PATENT OFFICE 1,999,112

REFINING OR PURIFICATION OF BENZOL, PETROL, AND LIKE LIGHT SPIRITS

Thornton Scott, Oakleigh, Chelford, England, assignor to Refiners Limited, Manchester, England, a British company Application January 4, 1934, Serial No. 705,300
In Great Britain December 3, 1932

7 Claims. (Cl. 196—44)

This invention relates to the purification of benzol, petrol and like light spirits (hereinafter termed benzol) by the use of ferric sulphate with or without fuller's earth as the refining medium.

The object of my present invention is to provide an improved method of using the refining medium which economizes in the latter and avoids the necessity for a washing operation with the refining medium and a subsequent filtration to remove the exhausted refining medium and the precipitated impurities.

In accordance with my invention, the benzol, which is free or has been freed from bases, and which is at a temperature of from 40° to 80° C., is caused to percolate through a bed consisting of ferric sulphate (with or without fuller's earth) and coke or other inert material which acts to maintain the refining medium in a sufficiently open condition to allow of the flow of the benzol therethrough. If desired the ferric sulphate may be deposited on the coke by evaporating a solution of ferric sulphate containing the coke.

The filter bed should be so proportioned that every portion of the benzol is in contact with the refining medium for at least 30 seconds. The refining medium when it is exhausted is replaced.

If desired or necessary in any case the benzol can be forced through the filter bed under pressure.

After the refining operation, the benzol is neutralized. This may be accomplished in a continuous manner with a liquid or solid neutralizer. When a solid neutralizer is employed, this may be in a coke or like filter bed. Thereafter the benzol is distilled, the impurities remaining in the still.

Referring to the accompanying sheet of explanatory drawing:—

Figure 1 is a diagram of a plant for the continuous refining of benzol in accordance with my improved process.

Figure 2 is a sectional view of a form of apparatus in which the refining treatment is effected.

In Figure 1, the benzol which has been or is free from bases is contained in the tank $a$ and is pumped by the pump $b$ to the overhead tank $c$ from which it falls through a heater $d$ to the refiner $e$. From the latter it passes through a cooler $f$ to a neutralizer $g$ and then to a still. $h$ is an overflow pipe for $c$, and $i$ a branch permitting treated benzol to be returned to $c$ for further treatment in $e$ if required. $j$ is a by-pass pipe to cut out the tank $c$ if desired. Suitable control valves are provided where required and as indicated in the diagram.

The refining tank $e$ is shown in detail in Figure 2 in a preferred form. The ferric sulphate with or without fuller's earth is contained within the removable inner vessel $k$ having a projecting flange $m$ at its upper end by which it rests upon an inner flange $n$ upon the vessel $e$. Lifting tackle can be secured to plates $o$ projecting from the top of the vessel $k$, to enable the latter to be lifted out of the vessel $e$ when the cover $e^1$ of the latter has been removed. A perforated cover plate $p$ rests upon the top of the vessel $k$ and has apertures therein to pass over the plates $o$. The base $q$ of the vessel $k$ may be perforated as shown. It serves to support a removable base $r$ which is perforated and has a flannel or like filter cloth $s$ thereon to prevent the passage of solids therethrough. The removable base $r$ has eye pieces $t$ thereon to enable it to be withdrawn from the inside of the vessel $k$ after refining medium has become exhausted and requires replacing.

The benzol enters at $u$ and leaves at $v$. $w$ is a drain connection which has a suitable valve thereon. $x$ is an inlet branch for compressed air which is used to expel all liquid from the apparatus prior to removing the spent refining medium upon the base $r$ from the apparatus by raising the said base with if desired also the vessel $k$ from the vessel $e$.

With my improved process in which the refining medium is used in the form of a filter bed and the operation is continuous, I find that I obtain very efficient results with a considerable economy in the quantity of refining medium used.

What I claim is:—

1. The process of refining or purifying benzol, petrol and like light spirits in which the latter which at the time of treatment are free from bases are heated to a temperature of from 40° to 80° C. and caused to percolate through a bed consisting of ferric sulphate and inert material which acts to retain the ferric sulphate in a sufficiently open condition to allow of the flow of the benzol or the like therethrough, the depth and surface area of the bed being proportioned to maintain every portion of the benzol or the like in contact with ferric sulphate for at least 30 seconds.

2. The process claimed in claim 1 wherein an adsorbent earth is present together with the ferric sulphate in the bed.

3. The process claimed in claim 1 wherein fuller's earth is present together with the ferric sulphate in the bed.

4. In the process claimed in claim 1, forcing the benzol or the like under pressure through the bed containing the ferric sulphate.

5. In the process claimed in claim 1, producing the bed containing the ferric sulphate by evaporating a solution of ferric sulphate containing coke.

6. The process of refining or purifying benzol, petrol and like light spirits in which the latter which at the time of treatment are free from bases are heated to a temperature of from 40° to 80° C. and caused to percolate through a bed consisting of coke and to an intimate mixture of ferric sulphate and an absorbent earth coated upon the surface of the said coke, the depth and surface area of the bed being proportioned to maintain every portion of the benzol or the like in contact with ferric sulphate for at least 30 seconds.

THORNTON SCOTT.